United States Patent

Halasa

[15] 3,674,760
[45] July 4, 1972

[54] METHOD OF PRODUCING BUTADIENE-STYRENE COPOLYMER

[72] Inventor: Adel F. Halasa, Bath, Ohio
[73] Assignee: The Firestone Tire & Rubber Company, Akron, Ohio
[22] Filed: Sept. 2, 1970
[21] Appl. No.: 69,173

[52] U.S. Cl. ...................................... 260/83.7, 252/431
[51] Int. Cl. ..................... C08f 19/08, C08f 1/28, C08d 1/32
[58] Field of Search ........................... 260/83.7, 94.2 T

[56] References Cited

UNITED STATES PATENTS

| | | | |
|---|---|---|---|
| 3,294,768 | 12/1966 | Wofford | 260/83.7 |
| 3,331,821 | 7/1967 | Strobel | 260/83.7 |

*Primary Examiner*—James A. Seidleck
*Attorney*—S. M. Clark and Gordon B. Seward

[57] ABSTRACT

Random butadiene-styrene copolymer is formed in solution with alkyllithium as catalyst and at least 4 parts of lithium alkoxide per part of alkyllithium as modifier. The copolymer is free of block styrene and has a vinyl content of 10–25 percent by weight.

5 Claims, No Drawings

METHOD OF PRODUCING BUTADIENE-STYRENE COPOLYMER

The invention relates to producing a random butadiene-styrene copolymer. It includes the process of production and the resulting copolymer.

The randomization of butadiene-styrene copolymer has been the subject of many patents and articles. Hsieh's Effect of Lithium Alkoxide and Hydroxide on Polymerization Initiated with Alkyllithium, appearing in 8 Journal Polymer Science, Part A-1, pages 533 to 543 includes a good bibliography. This article and articles by Hsieh and Wofford in 7 Journal Polymer Science, Part A-1, pages 449–460 and 461–469 discuss polymerization with alkyllithium using alkali metal alkoxide as a modifier. It is stated that no randomization of the styrene takes place in butadiene-styrene polymerization using lithium t-butoxide as modifier.

However, according to the present invention, random polymerization is effected if sufficient lithium butoxide is used as a modifier of alkyllithium catalysis of butadiene-styrene copolymerization. No block styrene is formed and the vinyl content of the polymer is between 10 and 25 percent by weight, both of which contribute to the ease of processing the copolymer.

The ratio of the styrene to the butadiene in the copolymer may vary from 10 to 50 parts by weight of styrene to 90 to 50 parts of butadiene, but for a rubber polymer it is preferably 15 to 40 parts by weight of styrene to 85 to 60 parts of butadiene. Rubbers of the latter styrene content are suitable for use in tires, and have other uses. Other copolymers are useful as plastics and thermoset resins.

In carrying out the polymerization, about 0.1 to 5 parts by weight of the alkyllithium will be used as polymerization initiator per 100 parts of total monomer, and preferably about 0.2 to 3.0 parts will be employed. The amount of the alkoxide used as modifier may vary. It will be at least 4 parts per 1 part of alkyllithium, and may be as much as 15 or 20 or even 25 parts or more, but is preferably 6 to 10 parts.

The conditions of the polymerization need not be different from those normally employed. A temperature in the range of 20° to 180° C. may be used, although normally, temperatures in the range of 40° to 100° C. will be employed. An inert aliphatic hydrocarbon solvent such as hexane or heptane or a mixture thereof is usually used. The butadiene, styrene and other reactants must be of the purity required for polymerizations, and all of the various reactants must be used in a dry condition in the absence of oxygen and moisture and other material that will impair the catalyst activity.

A preferred catalyst is n-butyllithium but other alkyllithiums such as listed in Foster U.S. Pat. No. 3,317,918 can be used. Lithium t-butoxide is the preferred alkoxide, but others which may be used contain one to 10 carbon atoms, including for example lithium methoxide, ethoxide, isopropoxide, n-butoxide, t-amyloxide and the lithium salt of n, sec- or tert-alcohol, etc.

EXAMPLE

A 28-oz. bottle is charged with 264 grams of a blend of 24.7 percent 1,3-butadiene in 75.3 percent hexane. There was added 16 ml. of styrene, 1 mmole by weight of n-butyllithium and 6 mmoles of lithium t-butoxide per said 82 parts of monomer, as catalyst and modifier, respectively. The bottle was placed in a 50°C. constant-temperature bath for 64 hours. The resultant polymer was coagulated in methanol, stabilized with an antioxidant and dried. Properties of this polymer are included as Sample No. 1 of the following table.

A series of experiments was similarly carried out, copolymerizing butadiene-1,3 (BD) and styrene (St), heating at 50° C. for 16 hours, and the amounts of reactants and results are recorded in the following table.

| Sample No. | Polymerization reactants | | | | Polymer analysis | | | | Microstructure of BD portion | | |
|---|---|---|---|---|---|---|---|---|---|---|---|
| | Charge | | Catalyst, mmoles | | | | | | | | |
| | St. percent | BD percent | n-BuLi | t-BuOLi | DSV | Gel | Chemical block st. percent | I.R. St. percent | Cis-1,4% | Trans-1,4% | 1,2% |
| 1 | 22.0 | 78.0 | 1.0 | 10 | 1.48 | 0.0 | 0.0 | 22.6 | 27.2 | 55.8 | 17.0 |
| 2 | 22.0 | 78.0 | 1.0 | 15 | 1.47 | 0.0 | 0.0 | 23.0 | 25.8 | 55.0 | 19.1 |
| 3 | 22.0 | 78.0 | 1.0 | 20 | 1.47 | 0.0 | 0.0 | 22.8 | 24.0 | 54.4 | 21.6 |
| 4 | 22.0 | 78.0 | 1.0 | 25 | 1.51 | 0.0 | 0.0 | 23.0 | 23.3 | 53.2 | 23.5 |
| 5 | 21.0 | 79.0 | 1.30 | 2 | 1.64 | 0.0 | 7.09 | 20.9 | 31.6 | 56.8 | 12.0 |
| 6 | 26.0 | 74.0 | 1.30 | 20 | 1.63 | 0.0 | 0.0 | 25.4 | 25.4 | 52.6 | 22.0 |

The dilute solution viscosity (DSV) of each sample was satisfactory for commercial use. No gel or block styrene was formed in those samples which used as much as 4 mmoles of t-butoxide per mmole of n-butyllithium, and no block polystyrene was formed. The infrared analyses show the 1,2-content is between 10 and 25 percent which indicates low glass-transition temperature which makes these copolymers useful for tires. It is interesting to note that the 1,4-content is similar to that of polybutadiene made from alkyllithium without the modifier. This indicates that the lithium alkoxide does not materially change the micro-structure of the polybutadiene portion of the copolymer, and causes the styrene to enter as random styrene without forming blocks.

It is possible to produce a random copolymer of butadiene and styrene which is free of gel and block styrene and by using an alkyllithium/lithium butoxide ratio of 1 to at least 4, such a copolymer can be produced which has a vinyl content no greater than 25 percent and therefore a relatively low glass-transition temperature.

I claim:

1. In the process of copolymerizing 50 to 90 parts by weight of butadiene and 50 to 10 parts of styrene in hydrocarbon solvent and producing a random copolymer, using alkyllithium catalyst and a lithium alkoxide, the improvement in which 4 to 25 parts of alkoxide is used for each part of alkyllithium at a temperature of 20° to 180° C. using between about 0.1 to 5.0 parts by weight of the alkyllithium per 100 parts by weight of the total monomer used, the alkyl group of the alkoxide containing one to 10 carbon atoms.

2. The process of claim 1 in which the alkoxide is a t-butoxide.

3. The process of claim 1 in which 4 to 10 parts of lithium alkoxide is used per part of alkyllithium.

4. The process of claim 1 in which 6 to 10 parts of lithium t-butoxide is used per part of n-butyllithium.

5. The process of claim 1 in which 60 to 85 parts by weight of butadiene is copolymerized with 15 to 40 parts of styrene.

* * * * *

UNITED STATES PATENT OFFICE
CERTIFICATE OF CORRECTION

Patent No. 3,674,760     Dated July 4, 1972

Inventor(s) Adel F. Halasa

It is certified that error appears in the above-identified patent and that said Letters Patent are hereby corrected as shown below:

Col. 2, line 8, "64" should read --16--

Col. 2, line 26 (last column in table)

"12.0" should read --12.9--

Signed and sealed this 26th day of December 1972.

(SEAL)
Attest:

EDWARD M.FLETCHER,JR.
Attesting Officer

ROBERT GOTTSCHALK
Commissioner of Patents